June 14, 1949.  R. S. NEISWANDER  2,472,845
TENSIOMETER

Filed Aug. 31, 1944  2 Sheets-Sheet 2

INVENTOR
Robert S. Neiswander

BY Ralph L Chappell
ATTORNEY

Patented June 14, 1949

2,472,845

UNITED STATES PATENT OFFICE 2,472,845

TENSIOMETER

Robert South Neiswander, United States Navy

Application August 31, 1944, Serial No. 552,116.

8 Claims. (Cl. 73—143)

(Granted under the act of March 3, 1883, as amended April 30, 1928; 370 O. G. 757)

This invention relates to indicating means and more especially to tensiometer devices for measuring the tension in tensioned members.

It is customary in measuring the tension in a tensioned member such as a rod, cable, rope and etc., to employ means for deflecting the tensioned member and to connect to the deflecting means, means operable by the deflection of the tensioned member to indicate the force necessary to cause the deflection, and hence to indicate the tension in the tensioned member on a scale. Instruments for measuring tension which operate on this principle, have inherent disadvantages in that the scale reading depends upon the thickness of the tensioned member, and hence must be calibrated for each size tensioned member. Moreover, variations in the size of a given tensioned member will cause errors in the scale readings. Since the scale reading in this type of instrument depends upon the "bend" in the cable, it is also evident that error in the scale reading will be introduced by the stiffness of the cable, that is, a stiff tensioned member will read high and a flexible tensioned member will read low. It is also apparent that in order to obtain a sensible reading the tensioned member must be deflected appreciably. This fore-shortens the tensioned member about one-tenth of an inch, which causes a high reading on the scale. Finally, because of the small deflection which is kept as low as possible to minimize the fore-shortening effect, it is necessary to provide a semi-precision deflecting indicator which is delicate, costly and difficult to use with satisfactory results.

It is an object of this invention to provide a tension measuring device which will not depend upon the deflection of the tensioned member, and hence will not be subject to the disadvantages referred to above, which will be simple and rugged in construction, and which will be readily useable by unskilled workers.

In accordance with the invention, the device comprises a pair of jaws adapted to grip the tensioned member at spaced points, means for moving the jaws toward each other a sufficient amount to produce slack in the tensioned member between the jaws, and means associated with the means for moving the jaws to indicate the tension in said tensioned member. More specifically, as illustrated herein, a pair of articulated levers are employed, the levers being pivotally joined at one end and have a gripping means at their opposite ends adapted to engage the tensioned member. Means is provided for drawing said levers together and one of the levers is composed of two parts joined in end to end relation by a stiff spring so that the one part will be deflected with respect to the other by the force necessary to move the levers toward each other, and a pointer is connected to one of the parts and operated thereby when the latter is deflected to indicate the tension in said tensioned member. There is also provided means for indicating when slack is produced in the tensioned member comprising a plunger spring pressed toward the tensioned member, and a pointer operated by said plunger to indicate the amount of slack.

The details of the aforesaid device will now be described with reference to the accompanying drawings, in which:

Fig. 3a is a perspective view of a left hand gripping member;

Figure 1:
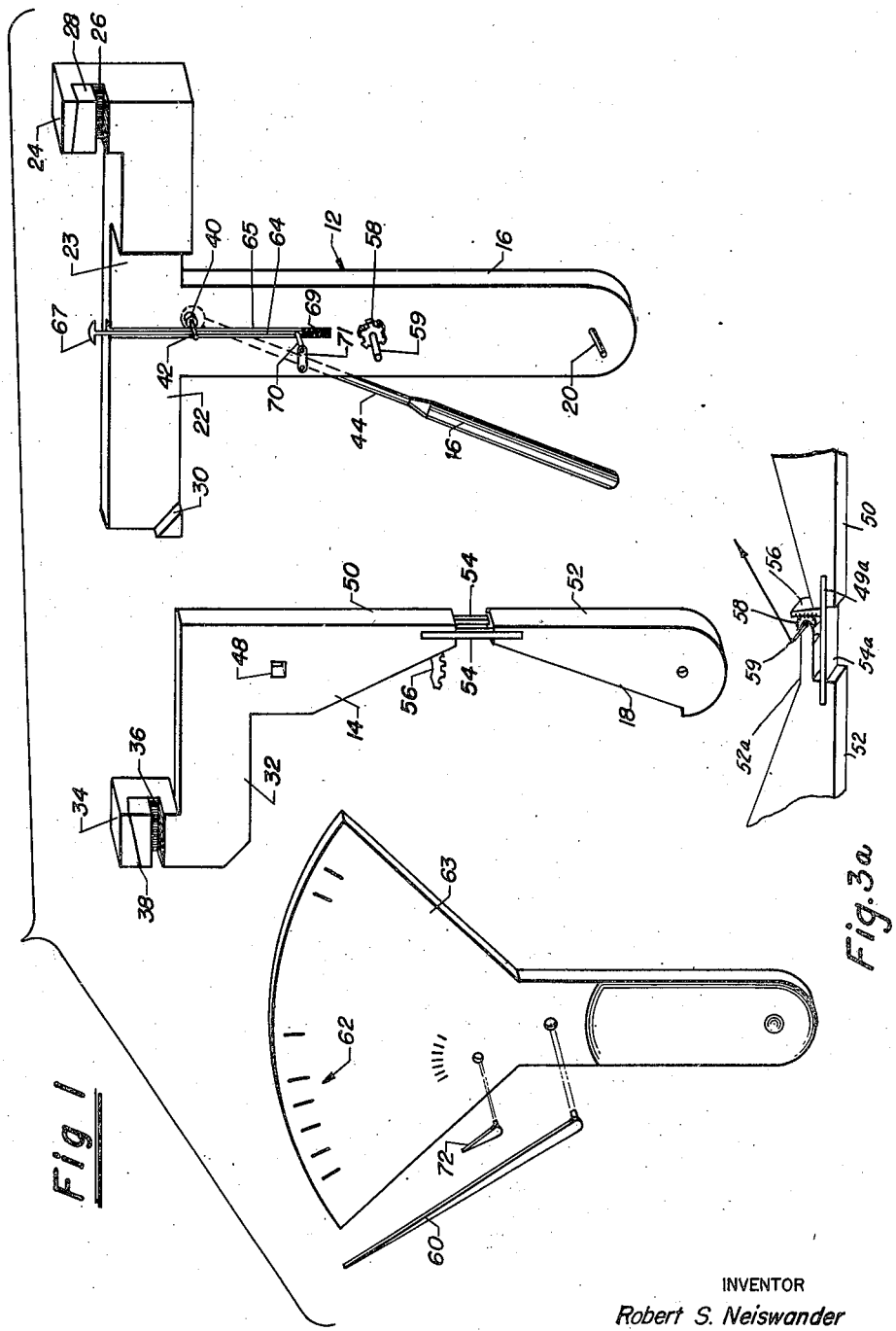
Fig. 1 is an exploded view of the preferred form of my invention.

Referring to Fig. 1 the tensiometer, indicated generally by the reference character 10, is shown as comprised of two levers 12 and 14, Fig. 1, pivotally joined near their ends 16 and 18 by a pivot pin 20. The opposite end of the lever 12 has a substantially T-shaped head 22, one end of which terminates in an upwardly extending jaw 24, having formed in one face a slot 26 in which there is mounted a wedged shaped gripping member 28. The opposite end of the T-shaped head is provided with a forwardly extended lug 30, the purpose of which will appear hereinafter. The lever 14 has an L-shaped head 32, the end of which terminates in a jaw 34 corresponding to the jaw 24, and, as in the former case, there is provided in one face of the jaw a slot 36 in which there is mounted a wedged shaped gripping member 38.

Figure 2:
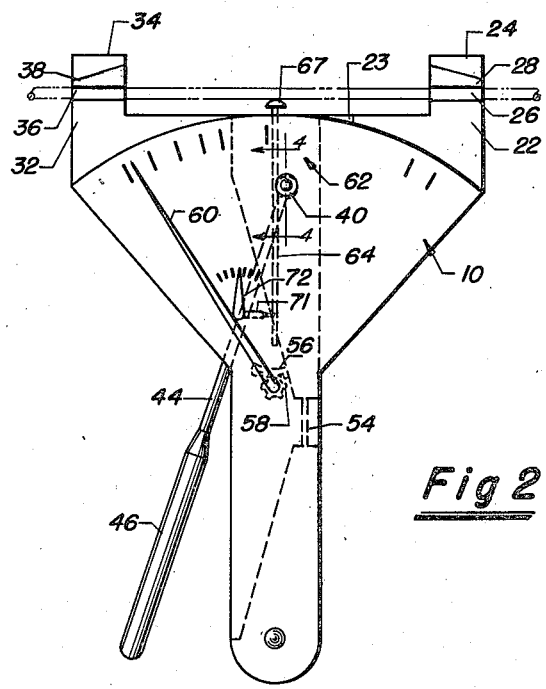
Fig. 2 is an elevational view showing the elements of the device in assembled relation.

The two levers are joined, as stated before, at their lower end by the pivot pin 20 in superposed relation so that the levers lie face to face with the jaws 24 and 34 at opposite sides of the instrument as indicated in Fig. 2. It will be observed that the T-shaped head 22 of the lever 12 is recessed at 23 to receive the L-shaped head 32 of the lever 14 and that the lug 30 serves as a support for the terminal end of the L-shaped head. The jaw 34 projects rearwardly of the L-shaped head 32 so that it is in alignment with the jaw 24.

Figure 4:
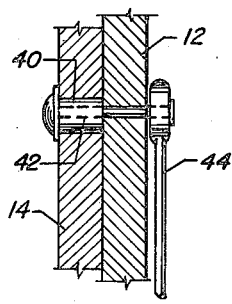
Fig. 4 is a section on the line 4—4 of Fig. 2.
Figure 5:
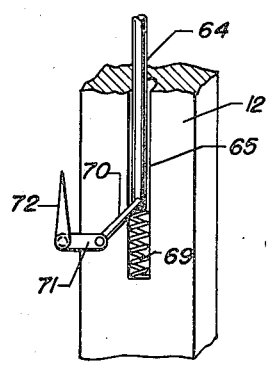
Fig. 5 is a fragmentary view of the linkage for operating the slack indicator.

An eccentric 40, Fig. 4, is mounted on the inside of the lever 12 near the T-shaped head 22, the eccentric being fixed to a spindle 42 which is journaled in the lever 12. The spindle 42 projects through the lever 12 to the rear side and has fixed to it a rod 44 which terminates in a handle 46 by means of which the eccentric may be rotated. An opening 48 is provided in the lever 14 at a position substantially opposite the eccentric on the lever 12 and is adapted to receive the eccentric. It is evident, therefore, that when the members 12 and 14 are superposed with the eccentric projecting into the opening 48, rotation of the eccentric by means of the handle 46 will draw the levers toward each other or move them away from each other, depending upon the direction of rotation of the eccentric. The levers are drawn toward each other by the eccentric about one one-hundredth of an inch which minimizes fore-shortening and hence high scale readings.

Figure 3:
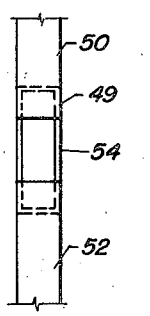
Fig. 3 is a fragmentary view of the joint between the two parts of the left hand gripping member as seen from the right side of Fig. 2.

The lever 14, as is evident by reference to Fig. 1, is divided into two members 50 and 52. These members are joined in end to end relation by a stiff spring 54 which resists bending between the members 50 and 52 but will allow a given amount of bending for the application of a given force. The spring is substantially rectangular in shape (Fig. 3) and lies in parallel slots 49 so that it is flush with the surface of the sections 50 and 52. Mounted on the member 50 is a rack 56 which is adapted to cooperate with a gear 58 fixed to a spindle 59 journaled in the member 12. The outer end of the spindle 59 has fastened thereto a pointer 60 adapted to move along a scale 62 formed on a cover plate 63 (Fig. 1) attached to the front surface of the lever 14. It is evident by the aforesaid construction, that when a load is applied to the levers 12 and 14 to move them toward each other the rack 56 will rotate the gear 58 and hence cause movement of the pointer 60 along the scale 62. The scale 62 is calibrated in such a manner that for the application of a given force and given deflection of the spring 54, a given tension will be indicated on the scale.

A modified construction is shown in Fig. 3a in which the members 50 and 52 are joined in end to end relation by a stiff flat spring 54a which resists bending by the members 50 and 52. The ends of the spring are socketed in slots 49a formed in the adjacent ends of the members 50 and 52. As a further modification, not only is the rack 56 fixed to the member 50, but the gear 58 with which it cooperates is carried by the member 52, rather than by the member 12, as heretofore described. As illustrated, an extension 52a is formed integral with the end of the member 52 and is bifurcated at its end rotatably to receive the gear 58. The spindle 59 on which the gear 58 is mounted extends forwardly through the extension 52a and carries, as previously described, the pointer 60. As thus described, it is evident that relative movement between the members 50 and 52 by flexing of the spring 54a is reflected by the movement of the pointer 60.

The scale reading of the tension in this instrument does not depend upon the deflection of the tensioned member, however, since it may be difficult to determine at what instant the tension in the tensioned member is released, there is provided a slack indicator. This indicator comprises a rod 64 slidably mounted in a groove 65 formed on the inner face of the lever 12, the rod projecting from the top edge of the T-shaped head 22 and having at its end a flat head 67 adapted to bear against the tensioned member. A light spring 69 set into the lower end of the groove yieldably urges the rod toward the tensioned member and on the lower end of the rod is provided a pin 70 which is pivotally connected to an arm 71 the latter being connected to and adapted to tilt a pointer 72 mounted to move across the outer face of the lever 12 to indicate slack.

In operation the device is adjusted by rotation of the eccentric 40 to move the jaws 24 and 34 as far apart as possible and then it is placed astride the tensioned member with the tensioned member fitted snugly into the jaws as indicated in Fig. 2. The slack indicator is then adjusted to engage the cable and the arm 46 is rotated to draw the jaws toward each other. The wedged shaped gripping blocks 28 and 38 will automatically grip the cable and as the jaws are drawn together, a certain amount of slack will be produced in the tensioned member which will be indicated by the slack indicator. The force necessary to draw the jaws together will be transmitted to the levers 12 and 14 since they are pivoted at their lower end and will cause the two members 50 and 52 of the lever 14 to bend with respect to each other at the spring 54. This bending of the lever 14 will result in movement of the rack 56 fixed to the member 50 with respect to the gear 58 and hence the movement of the pointer 60 over the tension scale 62. As heretofore pointed out, the scale 62 is calibrated so that for a given force a given tension reading will result on the scale 62.

The invention described herein may be manufactured and used by or for the Government of the United States for governmental purposes without the payment of royalties thereon or therefor.

What is claimed is:

1. A device for measuring the tension in a tensioned member comprising a pair of levers pivotally joined at one end and having gripping member at their opposite ends adapted to engage the tensioned member at spaced points, one of said levers being deformable, an eccentric mounted on one of said levers between the pivot point and the gripping member, said eccentric being adapted to fit into an opening formed in the other lever in a corresponding position, an arm operable to rotate said eccentric thereby to oscillate the levers toward or away from each other about their pivot, and means associated with the deformable lever, and operable by the amount of deformation produced therein by movement of said gripping members toward each other to indicate the tension in said tensioned member.

2. A device for measuring the tension in a tensioned member comprising a pair of levers pivotally joined at one end and having gripping members at their opposite ends adapted to engage the tensioned member at spaced points, means for drawing said levers together to relieve the tension in the tensioned member, a flexible section in one of said levers deflectable by the movement of said levers toward each other, and means connected to said flexible section to indicate the force necessary to cause said deflection.

3. A device for measuring the tension in a tensioned member comprising a pair of levers pivotally joined at one end and having gripping means at their opposite ends adapted to engage the tensioned member at spaced points, one of said levers being constructed of two parts joined in end to end relation by a flexible member, means for drawing said levers toward each other in opposition to the tension in said tensioned member, and hence to bend the two parts with respect to each other, and means operative by bending of one of said parts with respect to the other to indicate the tension in said tensioned member.

4. A device for measuring the tension in a tensioned member comprising a pair of levers pivotally joined at one end and having gripping means at their opposite ends adapted to engage the tensioned member at spaced points, one of said levers being constructed of two parts joined in end to end relation by a flexible member, a driving member on one of said levers, a driven member on the other of said levers, a pointer connected to said driven member, means for urging the levers toward each other whereupon one section of said one lever is flexed a given amount with respect to the other member for a given force and will thereby move the driving member a given amount, said pointer being calibrated to indicate a given tension for a given deflection of the flexible member.

5. A device for measuring the tension in a tensioned member comprising means for gripping a section of the tensioned member at spaced points, means including a plurality of pivotally joined levers for moving said first named means toward each other a sufficient distance to produce a slack in the tensioned member between the jaws, means connected to said gripping means to indicate the force necessary to move them toward each other, and means associated with said levers for indicating the presence of slack in said tensioned member between the points.

6. A device for measuring the tension in a tensioned member comprising a pair of levers pivotally joined at one end and having gripping members at their opposite end adapted to engage the tensioned member at spaced points, means for drawing said levers together to release the tension in said tensioned member between the gripping members, means associated with said levers to indicate the force necessary to release the tension, and a spring pressed plunger associated with said levers and adapted to engage the slack portion of the tensioned member and operable to indicate slack.

7. A device for measuring the tension in a tensioned member comprising a pair of levers pivotally joined at one end and having gripping members at their opposite ends adapted to engage the tensioned member at spaced points, means for drawing said levers together to release the tension in said tensioned member between the gripping members, means associated with said levers to indicate the force necessary to release the tension, a plunger carried by one of said levers, a spring arranged to urge the plunger against the slack portion of the tensioned member, and indicator means connected to said plunger and calibrated to indicate the amount of slack.

8. A device for relieving the tension in a section of a tensioned member comprising a pair of levers pivotally joined at one end and having gripping jaws on the other ends adapted to grip the tensioned member at spaced points, an eccentric mounted on one of said levers between the jaw and the pivot point, said eccentric being adapted to fit into an opening formed in the other lever in a corresponding position, an arm operable to rotate said eccentric thereby to oscillate the levers toward or away from each other about their pivot.

ROBERT SOUTH NEISWANDER.

REFERENCES CITED

The following references are of record in the file of this patent:

UNITED STATES PATENTS

| Number | Name | Date |
| --- | --- | --- |
| 673,526 | Moore | May 7, 1901 |
| 1,647,287 | Floyd | Nov. 1, 1927 |
| 1,728,552 | Kennedy et al. | Sept. 17, 1929 |
| 2,002,977 | Carr | May 28, 1935 |
| 2,362,626 | Giffen | Nov. 14, 1944 |

FOREIGN PATENTS

| Number | Country | Date |
| --- | --- | --- |
| 801,604 | France | May 23, 1936 |